Patented Sept. 28, 1954

2,690,453

UNITED STATES PATENT OFFICE 2,690,453

PROCESS FOR THE PREPARATION OF STILBENE DERIVATIVES

Leslie Noel Savidge and Richard Thomas, Bromborough, England, assignors to Lever Brothers Company, New York, N. Y., a corporation of Maine No Drawing. Application July 26, 1950, Serial No. 176,068

Claims priority, application Great Britain April 3, 1947

15 Claims. (Cl. 260—507)

The present invention relates to a process for the manufacture of stilbene derivatives.

In our copending application Ser. No. 18,066, filed March 30, 1948, now Pat. No. 2,643,197 of which the present application is a continuation-in-part, there is described a method of imparting

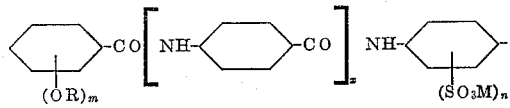

to materials, particularly cotton, linen and other cellulosic materials, blue fluorescent effects by incorporating in the materials a small proportion of a compound of the general formula:

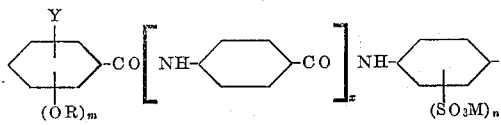

in which each R and R' is a hydrocarbon radical, such as alkyl, aryl or aralkyl, lower alkyl groups of from 1 to 4 carbon atoms being preferred; each $x$ and $x'$ is zero or a small integer such as 1, 2, 3, or the like; each $n$, $n'$, $m$ and $m'$ is an integer expressing the number of the respective groups substituted in the respective benzene rings, such as 1, 2, 3, 4 and the like (the maximum number being the positions on the benzene rings which are not otherwise substituted) and each M and M' is hydrogen or a cation such as sodium, potassium, ammonium, or the like; each Y and Y' is hydrogen or a substituent such as alkyl, i. e., methyl or ethyl, acylamino, i. e., acetylamino, and the like. The components do not contain any free (primary) amino groups directly attached to any benzene ring, since the presence of such groups renders the compounds unstable to light, air and oxygen. Any of the benzene rings may contain substituents (except as specified above), such as methyl, acetylamino, and the like. Salts, such as the sodium salt, are most convenient to use in practice.

The present invention provides a method of preparing compounds of the above type, which comprises bringing together under reactive conditions an amino stilbene compound having the general formula:

and an acyl chloride having the general formula:

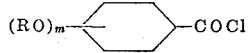

and after reaction thereof to produce a product having the general formula:

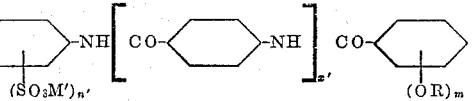

recovering the product. In the above scheme, each R is a hydrocarbon radical, such as alkyl, aryl or aralkyl, lower alkyl groups of from 1 to 4 carbon atoms being preferred, each M and M' is hydrogen or a cation, such as sodium, potassium, ammonium or the like, each $x$ and $x'$ is zero or a small integer, such as 1, 2, 3, or the like, each $n$, $n'$ and $m$ is a small integer expressing the number of the respective groups substituted in the respective benzene rings (the maximum number being the positions on the benzene rings which are not otherwise substituted). Any of the benzene rings may contain further substituents, such as methyl, acylamino and the like. Where a product is desired having acylamino groups in the terminal benzene rings, the corresponding nitroalkoxybenzoyl chloride should be used in the reaction and the nitro-groups of the resulting compound reduced to amino-groups which are then acylated.

The reaction is carried out in solution in bases such as pyridine, quinoline or piperidine, or in mixtures of these bases and water. If the rate of hydrolysis of the acyl chloride is slow, compared to the rate of reaction thereof with the 4,4'-diamino-stilbene compound, the reaction may be carried out in aqueous media. If, however, the hydrolysis reaction is rapid, a large quantity of the acyl chloride may be lost thereby since reaction between product of hydrolysis, the corresponding acid, and the aminostilbene compound does not occur; under these circumstances, there-

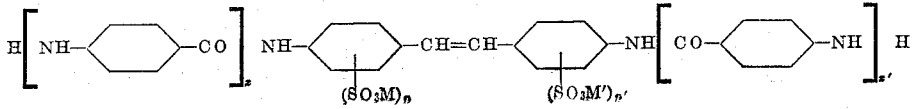

fore the reaction preferably is carried out in a nonaqueous base.

The reaction is exothermic and may be carried out under a range of temperature conditions. The reaction is usually completed under reflux.

In general outline, when the reaction is carried out in aqueous basic media, the preferred method of procedure is substantially as follows: The 4,4'-diaminostilbene-disulfonic acid is dissolved or suspended in water and sodium carbonate added until the mixture becomes alkaline. The acyl chloride, dissolved in the base, is then added to the mixture over a short period. The mixture is then heated under reflux until acylation is complete.

If insufficient sodium carbonate and/or organic base has been added at the start of the reaction, the solution will become acid as a result of liberation of hydrogen chloride. To precipitate the sulfonic acid, the solution is concentrated, acidified and cooled. To recover the sodium salt of the 4,4'-diamidostilbene mixture, the mixture is made alkaline again with sodium carbonate or hydroxide. The sodium salt precipitates from solution on cooling if the solution is sufficiently concentrated and is recovered by filtration or centrifuging. The crude material may be recrystallized from hot aqueous pyridine.

When the reaction is to be carried out in nonaqueous basic media, such as pyridine, in general outline the preferred procedure is as follows: The 4,4'-diaminostilbenedisulfonic acid is dissolved in pyridine and the acyl chloride added thereto. Reaction is completed by heating, preferably under reflux, and the pyridine salt of the diamidostilbene-di-sulfonic acid acidified by addition of aqueous hydrochloric acid in sufficient amount to precipitate the diamidosulfonic acid, which is then separated. The sodium salt of the acid may then be formed by dissolving the acid in sufficient sodium carbonate or hydroxide solution to completely neutralize the sulfonic acid groups. The sodium salt is then recovered from the mixture and may be recrystallized with aqueous pyridine as before.

Any desired metal salt of the sulfonate may be formed by adding the pyridine salt of the diamido stilbenedisulphonic acid to an aqueous solution of a water-soluble salt of the corresponding metal.

In order to facilitate a clear understanding of the invention, the following specific examples of preparing certain compounds will now be described:

Example 1

4,4'-diaminostilbene-2,2'-disulfonic acid (23 g.:0.062 mole) was stirred and heated with water (150 cc.) and sodium carbonate (5 g.). When the solution boiled, more sodium carbonate was added until the mixture became alkaline. p-Anisoyl chloride (21 g.:0.124 mole) in pure pyridine (50 cc.) was added during a period of a few minutes and the mixture heated under reflux for one hour. The liquid was made alkaline once more with sodium carbonate and cooled. The product was recovered by filtration, and washed with water until it was a pale orange color. The material was dissolved in hot aqueous pyridine (80:20; 2.5 liters) decolorized and filtered. On cooling the solution the product was obtained as a pale yellow crystalline powder. This was thoroughly washed with hot water and dried. Yield, 14 g. (approximately 35%). The product was sodium 4,4''di(p-methoxy)benzoylaminostilbene-2,2'-disulfonate:

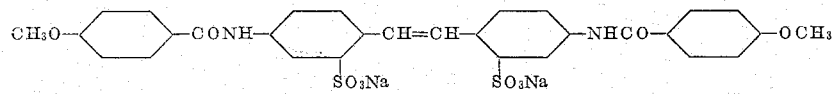

The m-methoxy isomer may be prepared by the same procedure using the m-anisoyl chloride.

Example 2

A mixture of o-cresol (108 g.), water (300 cc.), potassium hydroxide (336 g.), carbon tetrachloride (160 g.), ethyl alcohol (150 cc.) and copper bronze (0.3 g.), which darkened slowly, was heated under reflux for nine hours on a steam bath. The excess carbon tetrachloride was then distilled off, together with part of the alcohol. The cooled, filtered residue, which had a deep red color, was acidified and extracted with ether. The combined ethereal extracts were then washed with a saturated solution of sodium bisulfite (this treatment partially removes the ketonic by-product responsible for the red color of the ether solution). Subsequently the ether solution was extracted with sodium bicarbonate, and the combined aqueous extracts acidified with hydrochloric acid. The crude acid which precipitated was separated and recrystallized from hot water with the addition of charcoal. After recrystallization the product, 4-hydroxy-3-methyl-benzoic acid, had a melting point of 170–173° C. Yield 74 g. (50%).

4-hydroxy-3-methylbenzoic acid (40 g.) was dissolved in water (500 cc.) containing sodium hydroxide (22 g.). Dimethyl sulfate (27 cc.) was added to the warm solution and the whole vigorously shaken. Further alternate additions of dimethyl sulfate and concentrated sodium hydroxide solution were necessary before methylation was complete. In all, a total of 63.5 cc. of dimethyl sulfate was required. The mixture was acidified to precipitate the product, 4-methoxy-3-methyl benzoic acid, which, after crystallization from alcohol, had a melting point of 193° C. Yield 39 g. (90%).

4-methoxy-3-methyl benzoic acid (10 g.) was heated under reflux with thionyl chloride (7 cc.) and benzene (30 cc.) until there was no further evolution of hydrogen chloride. The benzene and excess thionyl chloride were removed by distillation and the residue, after being kept over sodium hydroxide to remove traces of thionyl chloride, was fractionated, that portion having B. P. 155° C./20 mm. being collected. Yield 9.15 g. (85%) of a colorless solid, 4-methoxy-3-methyl benzoyl chloride, of melting point 36° C. Alternatively, the crude material may be crystallized from petroleum naphtha (pentane) as a pink solid.

4-methoxy-3-methylbenzoyl chloride (5 g.) was added to 4,4'-diaminostilbene-2,2'-disulfonic acid (4 g.) and pyridine (10 cc.). The mixture immediately became warm, and reaction appeared to be complete after heating on the steam bath for one-quarter hour. The pyridine was, however, finally boiled by placing the mixture in an oil bath for one hour. (A test portion dissolved in water produced no color with sodium hypochlorite solution.) Water was added and also sufficient hydrochloric acid to precipitate the product, which was separated by filtration. The crude material was then stirred with sodium hydroxide solution until an alkaline reaction was obtained, when the pale yellow suspension was again filtered. The solid obtained was finally crystallized from 20% aqueous pyridine (with addition of charcoal) in the form of very pale yellow micro needles. Yield ca. 80%; overall yield about 40%. The product was sodium 4,4'-di(4-methoxy - 3 - methyl)benzoylaminostilbene-2,2'-disulfonate.

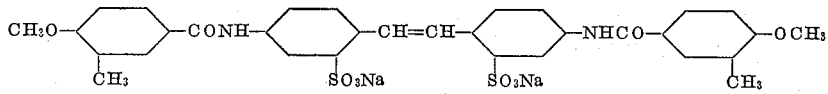

Similar methods may be used to prepare other isomeric methyl methoxy compounds, using the corresponding acyl chlorides.

*Example 3*

Sodium 4,4'-di(o-methoxy)benzoylaminostilbene-2,2'-disulfonate

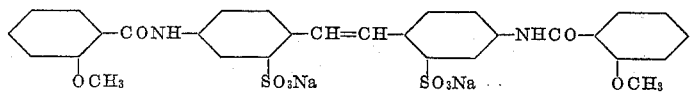

was prepared by a similar method to that used in Example 2, using o-anisoyl chloride instead of 4-methoxy-3-methylbenzoyl chloride.

*Example 4* p-Hydroxybenzoic acid (14 g.) was dissolved in sodium hydroxide solution (8 g. in 100 cc. water). To the cooled solution, diethyl sulfate (30.8 g. or 27 cc.) was added and then sufficient alcohol (60 cc.) to make the mixture homogeneous. It was allowed to stand for three days, after which a slightly acidified test portion of the reaction mixture gave no coloration with ferric chloride solution. Sufficient strong sodium hydroxide solution was added to give a strongly alkaline reaction and the mixture was heated under reflux for one-half hour, after which it was cooled and acidified. The crude dry product, p-ethoxybenzoic acid, was recrystallized from benzene/alcohol (50:50 mixture: approximately 100 cc.) and gave shiny plates, M. P. 198° C. Yield 11 g.

p-Ethoxybenzoic acid (4 g.) prepared as above was heated under reflux with thionyl chloride (4 g.) in benzene (20 cc.) until there was no further loss of hydrogen chloride. The benzene was removed and the residue, which rapidly solidified while still hot, was kept over caustic soda to remove traces of thionyl chloride. Without further purification the product, p-ethoxybenzyl chloride, was used in the next stage.

4,4'-diaminostilbene-2,2'-disulfonic acid (4 g.) in water (64 cc.) was just neutralized at the boil with sodium carbonate. To the hot solution, p-ethoxybenzoyl chloride (4.4 g.) in pyridine (10 cc.) was added all at once. The product was worked up by filtration and washing, and finally recrystallized from aqueous pyridine. It was obtained as a pale yellow microcrystalline powder. Yield 2 g. (30%). The product was sodium 4,4'-di(p-ethoxy) benzoylaminostilbene-2,2'-disulfonate:

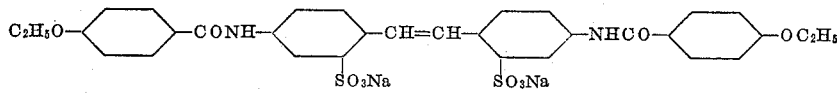

The o- and m-ethoxy isomers may be prepared by similar procedures, using o- and m-ethoxy benzoyl chloride.

*Example 5*

Sodium 4,4' - di(3,4,5 - trimethoxy) benzoylaminostilbene-2,2'-disulfonate

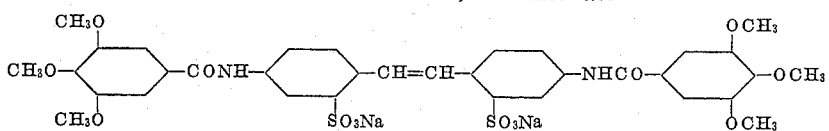

was prepared according to the method of Example 2, using 3,4,5-trimethoxy benzoyl chloride instead of 4-methoxy-3-methylbenzoyl chloride. Similarly, other trimethoxy and higher trialkoxy isomers may be prepared from the corresponding alkoxy benzoyl chlorides.

*Example 6*

Sodium 4,4'-di(p-phenoxy) benzoylaminostilbene-2,2'-disulfonate

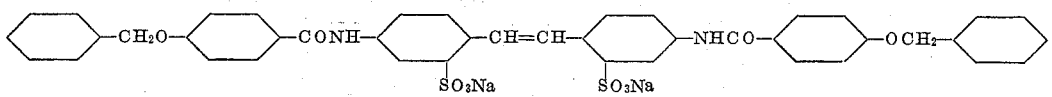

was prepared according to the method of Example 4, using p-phenoxy benzoyl chloride instead of p-ethoxy benzoyl chloride.

*Example 7*

Sodium 4,4'-di(p-benzyloxy) benzoylaminostilbene-2,2'-disulfonate was prepared according to the method of Example 4, using p-benzyloxy benzoyl chloride instead of p-ethoxy benzoyl chloride.

*Example 8*

Sodium 4,4'-di(3,4-dimethoxy) benzoylaminostilbene-2,2'-disulfonate was prepared according to the method of Example 2, using 3,4-dimethoxy benzoyl chloride instead of 4-methoxy-3-methylbenzoyl chloride.

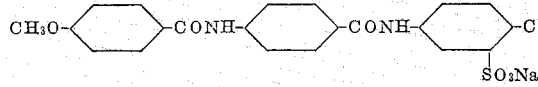

Likewise, the other isomeric dimethoxy compounds may be prepared from the corresponding dimethoxy benzoyl chlorides.

*Example 9*

4-methoxy-3-nitrobenzoic acid (1.5 g.), benzene (5 cc.) and thionyl chloride (3 cc.) were heated at the boil for 30 minutes. The excess thionyl chloride and benzene were removed by distillation in vacuo, and the residue of crude 4-methoxy-3-nitrobenzoyl chloride solidified on cooling.

1.5 g. of this crude product, without further purification, were mixed with 4:4'-diaminostil-

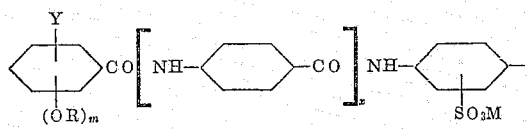

bene-2:2'-disulfonic acid (1.5 g.) and anhydrous pyridine (10 cc.) and heated on a steam-bath for 2 hours. Water was then added and the mixture acidified with hydrochloric acid to precipitate 4,4'-di-(4''-methoxy-3''-nitro)-benzoyl-aminostilbene-2,2'-disulfonic acid.

The damp solid obtained after filtration was reduced, without further purification, by the addition of iron filings (3 g.) and acetic acid (20 cc.). After boiling for 2 hours, more iron (2 g.) was added and heating continued for a further 2 hours. The mixture was then diluted with water and made alkaline by the addition of sodium carbonate and filtered at the boil. Sodium 4,4'-di-(4''-methoxy-3''-amino) benzoylamino-stilbene-2,2'-disulfonate crystallised from the cooled filtrate as a pale yellow microcrystalline powder. Yield 2 g. (approx. 65%).

1 g. of this product was mixed with acetic anhydride (10 cc.) and sodium acetate (1.5 g.) and heated for 6 hours under reflux. After pouring the reaction mixture on to ice and water and making alkaline by the addition of sodium hydroxide, the crude product was obtained by filtration. Crystallisation from aqueous pyridine yielded sodium 4,4'-di(4''-methoxy-3''-acetyl-amino)-benzoylaminostilbene-2,2'-disulfonate

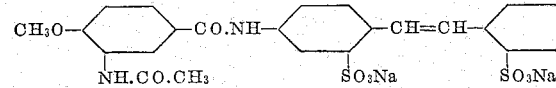

as a greyish yellow microcrystalline powder. Yield 1 g. (approx. 95%).

*Example 10*

Sodium 4,4'-di-(p-amino)benzoylaminostil-bene-2,2'-disulfonate (1.0 g.) was treated with anisyl chloride (2 cc.) and anhydrous pyridine (10 cc.) and the mixture heated under reflux for 4 hours (a test portion then diluted with water no longer showed a brown coloration on adding sodium hypochlorite solution). The mixture was poured into water and the solid filtered off. Crystallisation of the product from aqueous pyridine yielded sodium 4,4'-di-(p-methoxybenzoylamino)benzoylaminostilbene-2,2'-disulfonate

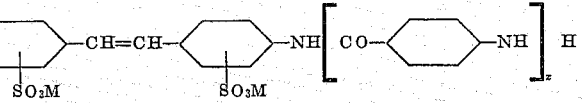

as pale greenish-yellow microcrystalline needles. Yield c. 1 g. (approx. 70%).

We claim:

1. The method which comprises reacting an amino stilbene compound having the formula:

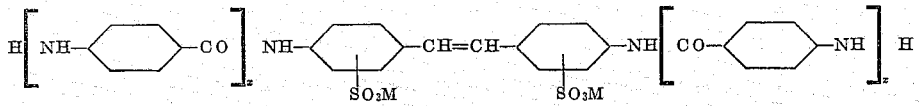

with an acyl chloride having the formula:

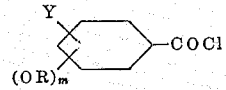

in the presence of an organic nitrogen base as a solvent and acid acceptor to produce a product having the formula:

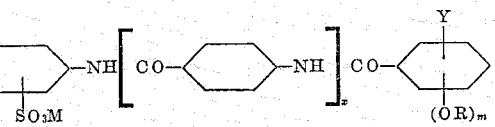

where R in the above formulae is selected from the group consisting of alkyl radical of 1 to 4 carbon atoms, phenyl and benzyl; M is selected from the group consisting of hydrogen, sodium, potassium and ammonium; $x$ is selected from the group consisting of zero and one; Y is selected from the group consisting of hydrogen, lower alkyl, and nitro groups; and $m$ is a small integer selected from the group consisting of 1, 2 and 3.

2. The method according to claim 1 in which the acyl chloride is a methoxybenzoyl chloride.

3. The method in accordance with claim 1 in which the base is pyridine.

4. The method in accordance with claim 1 in which the compounds are brought together in solution in an aqueous base.

5. The method in accordance with claim 4 in which the compounds are brought together in a mixture of water and pyridine.

6. The method in accordance with claim 1 in which the acyl chloride is an anisoyl chloride.

7. The method in accordance with claim 6 in which the anisoyl chloride is p-anisoyl chloride.

8. The method according to claim 6 in which the anisoyl chloride is o-anisoyl chloride.

9. The method according to claim 1 in which the acyl chloride is a dimethoxybenzoyl chloride.

10. The method according to claim 9 in which the acyl chloride is 3,4 dimethoxybenzoyl chloride.

11. The method according to claim 1 in which the aminostilbene compound is 4,4'-diaminostilbene-2,2'-disulfonic acid.

12. The method according to claim 1 in which the acyl chloride is 3-methyl-4-methoxybenzoyl chloride.

13. The method according to claim 1 in which the acyl chloride is 3-nitro-4-methoxybenzoyl chloride.

14. The method according to claim 13 in which the nitro-groups of the resulting product are reduced and the amino-groups produced are acylated.

15. The acylation process which comprises reacting 4,4'-diaminostilbene-2,2'-disodium disulfonate and an aromatic acid chloride in a mixture of water and pyridine to effect reaction between the aromatic acid chloride and both amino groups of the stilbene derivative.

References Cited in the file of this patent

UNITED STATES PATENTS

| Number | Name | Date |
|---|---|---|
| 2,468,431 | Eberhart et al. | Apr. 26, 1949 |
| 2,497,130 | Lubs et al. | Feb. 14, 1950 |
| 2,497,131 | Lubs et al. | Feb. 14, 1950 |
| 2,521,665 | Hausermann | Sept. 5, 1950 |